April 21, 1959  R. JAUME  2,883,058
FILTER UNIT AND FILTERS EQUIPPED THEREWITH
Filed Dec. 27, 1956  2 Sheets-Sheet 1
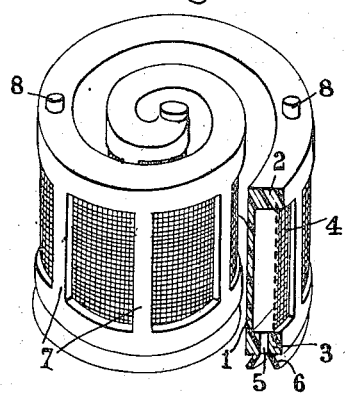
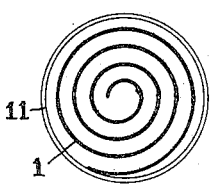
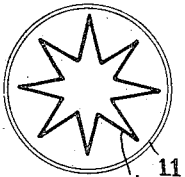
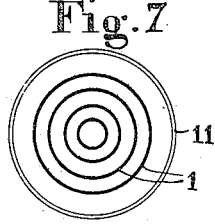
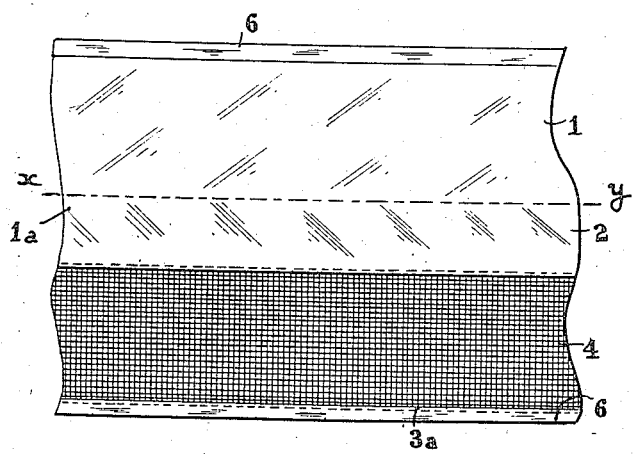
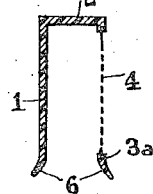
INVENTOR:
René Jaume
by Michael S. Striker
Agent April 21, 1959 R. JAUME 2,883,058
FILTER UNIT AND FILTERS EQUIPPED THEREWITH
Filed Dec. 27, 1956 2 Sheets-Sheet 2
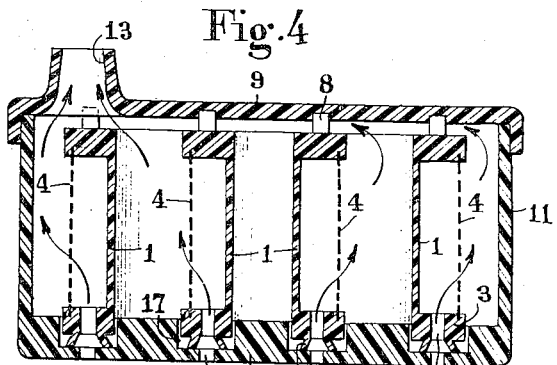
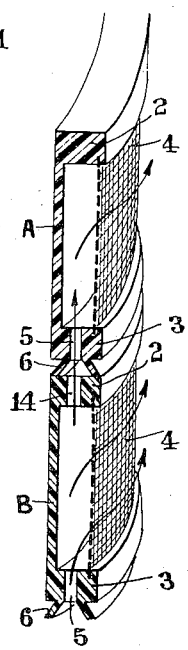
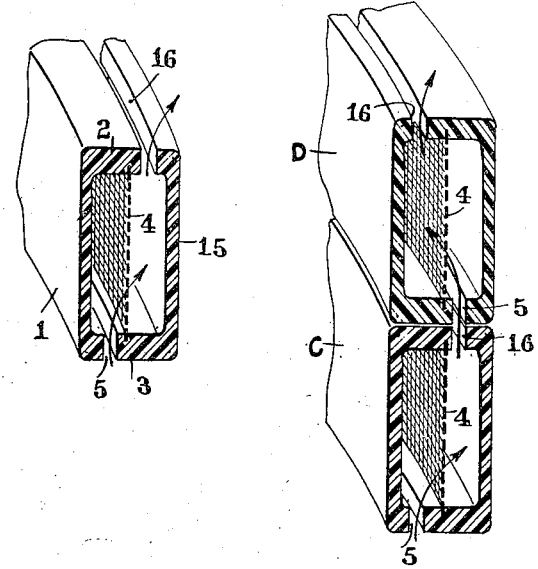
INVENTOR:
René Jaume
by Michael S. Striker
Agent United States Patent Office 2,883,058
Patented Apr. 21, 1959

2,883,058
FILTER UNIT AND FILTERS EQUIPPED THEREWITH

René Jaume, Paris, France

Application December 27, 1956, Serial No. 630,807

Claims priority, application France January 5, 1956

4 Claims. (Cl. 210—487)

This invention relates to a filter unit in the form of a strip of variable length which is designed in view of reducing its overall dimensions to a minimum and permitting its mounting in a filter housing of reduced dimensions. This filter unit is suitable for the manufacture of filters combining a very large filtering surface with minmium overall dimensions. Moreover, this filter unit is also designed with a view to simplify considerably the manufacture and assembling of filters.

The strip or band-shaped filter element of this invention, which may be of variable length to suit constructional requirements, consists of a trough-shaped wall or partition having disposed between its flanges or side walls a filter cloth having its edges embedded in the material of the aforesaid wall, so that the assembly forms an integral unit providing a complete fluid-tightness along the edges of the filter cloth, the trough-shaped wall being closed at its ends and comprising in addition a plurality of spaced apertures for the ingress of the fluid to be filtered, for example through one of its edges, flanges or side walls.

According to an essential feature of this invention, the trough-shaped wall consists of molded plastic, preferably injection-molded or extruded plastic, and according to a possible, typical embodiment thereof the plastic material may be molded continuously along the edges of the filter cloth so as to flow completely thereacross as it fills the interstices of the cloth. Also preferably, the trough-shaped partition or wall is of the semi-flexible or flexible type so that it can be wound, bent or corrugated in view of fitting a relatively long filter unit made therefrom into a case, housing or filter box of relatively reduced dimensions.

It is another object of this invention to provide improved filter means characterized essentially in that each filter consists of a housing enclosing at least one filter unit as broadly defined hereinabove which is disposed perpendicularly between two parallel walls of the housing, one wall having formed therein a plurality of fluid inlet apertures engaged by the aforesaid spaced apertures of the filter unit or units so that the edges of these apertures register with one another, the other wall of the housing having a plurality of fluid outlet apertures formed therein, through which the filtered fluid collected in the housing after passing through the filter cloth of the filter unit or units is discharged from the apparatus.

In order to afford a clearer understanding of the invention and of the manner in which the same may be carried out in the practice, reference will now be made to the accompanying drawings forming part of this specification and illustrating diagrammatically by way of example a few typical embodiments thereof. In the drawings:

Figure 1 is a perspective and part-sectional view showing a first embodiment of a filter unit constructed in accordance with the teachings of this invention.

Figure 2 is a plan view from above showing a modified embodiment fo the filter unit, during a manufacturing step.

Figure 3 is a cross-sectional view showing the same filter unit in its final condition.

Figure 4 is a cross-sectional view showing a filter consisting of a housing or case enclosing a filter unit wound as a spiral.

Figures 5, 6 and 7 are diagrammatic horizontal sections showing three possible mountings of a filter unit of this invention in a filter case.

Figure 8 is a part-sectional, part-isometric view of a modified embodiment of the filter unit of this invention, supporting a similar filter unit.

Figure 9 is a part-sectional, part-isometric view showing another possible embodiment of the filter unit of this invention, and Figure 10 is another part-sectional, part-isometric view of two superposed and co-acting filter units of the type illustrated in Fig. 9.

The filter unit illustrated in Fig. 1 of the drawings consists of a fluid-tight wall or partition 1 which is of trough-shaped configuration and comprises side walls, edges or flanges 2, 3 between which a filter cloth 4 extending parallel to the trough bottom is disposed. The trough-shaped wall 1 may vary in length, as required, and the assembly is substantially of strip configuration. The edges of the filter cloth 4 are embedded in the material of the trough-shaped wall 1, so that the assembly forms an integral unit and a perfect sealing joint is obtained between the sides of the trough-shaped wall 1 and the edges of the filter cloth 4.

To this end, the filter unit is manufactured preferably by molding the wall 1 on the edges of the filter cloth 4. During this manufacturing step, the material constituting the wall 1, which is in a fluid state, penetrates the interstices of the edges of the filter cloth and flows right therethrough. After the aforesaid material has set, the edges of the filter cloth are definitely retained and embedded in the side walls or flanges of the partition 1. The latter may be made of any suitable material, for example a metal or a suitable alloy, or better still, of plastic material. In this last case the molding step may be effected by casting, compression, or under pressure in combination with the action of heat or in the cold state, but a preferred way of carrying out this invention consists in injecting a plastic material in order to promote the penetration of the molded material through the interstices of the edges of the filter cloth. As an advantageous plastic material suitable for carrying out this invention a superpolyamid resin such as polyhexamethylene-adipamid may be used, for this resin will shrink to a substantial degree upon setting so that it will strongly clamp the yarns or fibres of the filter cloth and further promote the cohesion of the assembly.

However, this cohesion may be further increased by using a filter cloth consisting of plastic fibres, more particularly polyamid resin or superpolyamid resin (for example polyhexamethylene-adipamid), and manufacturing the trough-shaped wall 1 with the same material. Thus, the molded material of the wall 1 will be definitely and intimately sealed or welded to the yarn or fibre material of the filter cloth and the assembly will be characterized by a considerable homogeneousness. Of course, the molding of the trough-shaped wall 1 on the edges of the filter cloth 4 is accomplished in a suitable mold of adequate length having formed therein impressions corresponding in shape to the member 1 and to the elements associated therewith. The filter cloth 4 is laid into the mold prior to the molding operation proper, and the mold is provided with adequate positioning means therefor.

Besides, the filter unit according to this invention may be manufactured by forming beforehand a flat molded strip for example of plastic material and subsequently incorporating therein, in one portion of its surface, the filter cloth 4. This flat strip, as illustrated in Fig. 2, comprises on the one hand a wall 1 adapted to constitute the bottom of the trough-shaped member of the filter unit and its upper wall 2, and on the other hand a filter cloth 4 having its edges embedded by molding on one side in the corresponding edges of the wall 1a and on the other side in a rod 3a of a molded plastic material which is substituted for the lower flange or side wall 3 of the trough-shaped strip of Fig. 1. Moreover, the free edges of wall 1a and rod 3a may be formed integrally with a molded sealing lip 6 for a purpose to be defined presently. The manufacture of this flat strip is extremely easy and requires but a mold of very simple design.

The filter unit according to this invention is formed by simply bending or folding the strip along its longitudinal axis x—y separating the two portions of the wall 1a which correspond to the bottom of the trough and to its upper edge 2, respectively. This bending step may be accomplished in the heated state by using a suitable form so that the assembly will definitely set to the final shape illustrated in Fig. 3.

The filter unit according to this invention may also be manufactured by forming beforehand two or three separate members which are subsequently assembled, for example by welding, with one another. This method of manufacture is advantageous because the molding of each elementary member is obviously easier and faster than the combined or single molding of a complete filter unit.

If the trough-shaped wall 1 is made of plastic material, it is also possible to manufacture it by extruding the plastic material along the edges of the filter cloth; to this end, an extruding die having an aperture of same contour as the cross-section of the wall 1 may be mounted at the outlet end of an extruding machine. This manufacturing method is advantageous on the other hand in that it permits the continuous production of a filter strip which may subsequently be cut to elements having the desired lengths according to requirements.

In all cases, the ends of the filter unit are obturated either by an end wall especially provided for this purpose and also made by molding, or by clamping and sealing the ends of the filter cloth with the bottom 1 of the trough-shaped element. To this end, the trough-shaped wall 1 is made of thermoplastic material, such as super-polyamid resin as already suggested hereinabove. Thus, the plastic material will soften when heated, and the application of a clamping pressure on the ends of the wall 1 and filter cloth 4 will somewhat embed the cloth in the plastic material of the wall. Preferably, the filter cloth will also be made of thermoplastic material of same character.

One side of the trough-shaped wall 1, i.e. the side 3 (Fig. 1) may comprise perforations or slots 5 through which the fluid to be filtered enters the relevant compartment. Then, the fluid must flow through the filter cloth towards the outlet and will be efficiently filtered. Preferably, the lower face of this side 3 will be formed with lips 6 disposed on either side of the apertures 5 to permit a fluid-tight mounting of the filter unit on a wall also provided with apertures registering with the filter unit apertures 5. These lips 6 are preferably molded integrally with the wall 1 when the latter is formed on the edges of the filter cloth 4, the mold carrying corresponding impressions.

The wall 1 may also be provided by molding with other integral portions or members, such as transverse reinforcing or stiffening bars 7 connecting the edges 2, 3 of wall 1 and also molded on the cloth material, in view of preventing the latter from being unduly distorted when the filter unit is utilized. The wall 1 may also comprise other members molded integrally therewith, for example elements such as studs 8 or any other suitable projections intended to permit its mounting or fixation in a filter housing or case. This wall 1 may also be formed with integrally-molded portions adapted to facilitate the mounting of the assembly. Thus, fixation or fastening members, such as screws or the like, may be embedded in the material of the wall 1 during the manufacture of the latter.

The material employed in the manufacture of the trough-shaped wall 1, for example a synthetic resin, is selected preferably with a view to form a semi-flexible or semi-rigid structure, and preferably a flexible structure, for example by reducing the wall thickness to the minimum consistent with the necessary strength of the device. Thus, the filter unit may easily be bent or wound on itself to reduce its overall dimensions to a minimum and fit in a filter housing or case of relatively reduced dimensions. Fig. 1 illustrates a typical embodiment wherein the filter unit is wound to form a spiral, and Fig. 4 shows a filter consisting of a spiral-wound element disposed between two parallel walls 9, 10 of a filter case or housing, this arrangement being shown diagrammatically in Fig. 5.

The case walls 9, 10 between which the filter unit is disposed consist of the cover and bottom, respectively, of the body 11 of the case. The inner face of the bottom 10 is formed with a spiral-shaped groove 17 adapted to receive the lower side 3 of the filter unit which is preferably semi-rigid or flexible so as to give a spiral shape thereto. The lips 6 on this side 3 of the filter unit will thus engage the bottom of the groove 17 and register with apertures 12 corresponding to the apertures 5 of the filter unit. Thus, these apertures 12 communicate with the apertures 5 and the inner space of the filter unit, the lips 6 making this communication fluid-tight. In this arrangement the apertures 12 constitute the inlet openings for the fluid to be filtered, the cover 9 comprising on the other hand an aperture 13 through which the filtered fluid is discharged from the apparatus after having been filtered through the filter cloth 4 and collected in the case 11.

The inner face of the cover 9 has a plurality of blind holes formed therein for receiving the registering studs 8 projecting from the edge 2 of the filter unit; these blind holes are suitably distributed so as to place the studs 8 themselves along a spiral and keep the relevant side of the filter unit properly positioned. If desired, these studs 8 may be replaced by any other suitable members, for example screws either molded or embedded in the material of the side 2, these screws or like members passing through the cover 9 to receive fixation nuts. In all cases it is advantageous to somewhat space the cover 9 from the relevant side of the filter unit so that the filtered fluid collected in the case 11 may flow unhampered inside the apparatus. It may be advantageous to provide clamping means for securing the cover 9 on the case 11 so as to urge the filter unit with a certain force against the inner face of the bottom 10, whereby the lips 6 will seal the joints between the apertures 5 and 12, as required.

Figs. 6 and 7 of the drawings illustrate two other arrangements of the invention wherein the semi-rigid or flexible filter unit is fitted in a cylindrical housing or case. In the arrangement shown in Fig. 6 the filter unit is bent alternately in- and outwards to form a star-like unit, and in the other arrangement (Fig. 7) the case 11 contains a plurality of cylindrical, concentrical filter units 1. Of course, the parallel sides of the filter unit are provided with positioning means to maintain the filter unit or units in the desired disposition. The filter unit or units may also be embodied in various other shapes, and if desired they may be secured in a flat position, for example by arranging a plurality of parallel elements or filter units in a common cylindrical housing which, in this case, may be rectangular or square.

From the foregoing, it is evident that the specific design of the filter unit constituting the basic element of this invention makes it possible to construct filters of relatively reduced dimensions but having a relatively important filtering surface, so that a very large quantity of fluid can be filtered in spite of the reduced volume of the apparatus. In fact, by arranging the filter units spiralwise or in the form of a plurality of concentrical cylindrical elements, a very extensive filtering surface is available in a case 11 of reduced cross-sectional dimensions. This is inasmuch advantageous as on the other hand the filter manufacturing and assembling steps are simplified to a substantial degree, since the filter unit incorporates its own mounting and connecting elements or members, so that it is sufficient to merely place it into a housing or case.

The Figure 8 illustrates a filter unit A of the type illustrated in Fig. 1 but associated with another filter unit B differing slightly from the former, the two filter units being superposed so that the lips 6 of element A engage the upper face of the side 2 of element B. The latter differs from the filter unit A in that its edge 2 is formed with apertures 14a which, when the two filter units A and B are superposed as shown, communicate with the apertures 5 of unit A. Thus, the fluid to be filtered which enters through the apertures 5 of the lower filter unit B is divided into two streams of which the one flows through the filter cloth 4 of element A and the other through the apertures 14a of element B, the apertures 5 of element A, and is finally filtered through the filter cloth 4 of this latter element. Thus, the filtering surface is doubled and it is possible to superpose a plurality of elements such as B, the uppermost element being of the type A so that a filtering apparatus of variable height, according to the size of the housing, may be constructed at will.

Figure 9 illustrates another modified embodiment of the filter unit of this invention. This filter unit differs from the preceding ones in that the sides 2, 3 of the molded or extruded wall or strip 1 extend beyond the filter cloth 4 and are bent back on themselves in the form of a wall 15 parallel to the filter cloth and to the bottom of wall 1. Thus, this filter unit is of substantially tubular shape and comprises two compartments disposed on either side of the filter cloth 4, a plurality of apertures or a single slot 16 for the discharge of the filtered fluid being formed along the side walls of the new compartment, preferably in the outer side 2.

I eat lunch with one of the proofreaders from the 7th

In the example illustrated the cross-section of the tubular element is of substantially rectangular shape but it is evident that this shape may differ, provided that it incorporates at least one flat side 3 having formed therein a plurality of apertures or slots 5, other apertures or a slot being provided in the opposite side of the wall and on the other side of the filter cloth.

Of course, this filter unit may be wound to a apiral shape without leaving any gap between the adjacent turns since the filtered fluid may escape through the slot 16 of the upper side 2.

Fig. 10 illustrates a filter unit C of the type shown in Fig. 9 but having superposed thereto another filter unit D of same type but wherein the disposition of the inlet and outlet apertures 5 and 16 is inverted so that the inlet apertures 5 of the upper unit D will register with the outlet apertures 16 of the lower unit C. Thus, the fluid to be filtered enters the apparatus through the inlet apertures 5 of the lower element C and follows the path indicated by the arrows through the filter cloth 4 of this lower filter unit so as to be filtered a first time; then the fluid escapes from the filter unit C across the apertures 16 and enters the other filter unit D through its inlet apertures 5; the fluid is filtered again in the upper filter unit D and finally discharged through the outlet apertures 16 thereof. Thus, the fluid is filtered twice in succession and the filtering action is more efficient. Of course, it is possible to superpose a plurality of filter units of this character in view of obtaining a more or less pronounced filtering action. On the other hand, the filter cloths of these various elements may differ, for example by having progressively narrower interstices or cloth texture from the bottom to the top of the apparatus so that the particles retained by the filter cloths will progressively decrease in size.

Of course, the filter units described hereinabove and illustrated in the accompanying drawings are given simply by way of examples and should not be construed as limiting the invention as many modifications may be brought thereto without departing from the spirit and scope of the invention as set forth in the appended claims. Thus, the filter illustrated in Fig. 4 of the drawings is but a mere example of a typical embodiment, the invention being applicable to any filter comprising essentially a filter unit of the type disclosed and illustrated, disposed vertically between the two parallel walls of a suitable housing or case.

Similarly, many modifications and alterations may be brought to the forms and details of the filter units or apparatus constructed in accordance with the teachings of this invention, without departing from the spirit and scope of the invention.

Thus, the filter cloth may consist of textile, natural or synthetic fibres, or even wire gauze, but it may also consist of a filtering material or wall of any other character, such as a porous and filtering plastic wall adapted to be embedded in the molded plastic material to constitute an integral unit therewith.

What I claim is:

1. A filter element adapted to be mounted in a filter housing, which comprises a strip-shaped filter cloth of flexible material, a support for said filter cloth comprising a U-shaped band having a bottom, side walls and end walls, said support being substantially of same length as said filter cloth and made by molding from a flexible plastic material, said filter cloth being secured approximately parallel to and spaced from said bottom, the longitudinal and transverse edges of said filter cloth being embedded throughout their contour in the side walls of said support in the vicinity of the edge of said walls and in the end walls of said support during the molding of said support so that the support material may flow through the meshes of the embedded edges of said filter cloth, one of said side walls of said support comprising inlet means for permitting the ingress of the fluid to be filtered into the space available in the U-shaped support and bound by said filter cloth, the said fluid being unable to escape from this space unless it flows through said filter cloth whereby it is filtered and spreads in said filter housing.

2. A filter comprising a filter housing provided with a cover and a bottom; a filter element resting on said bottom and including a strip-shaped filter cloth of flexible material, a support for said filter cloth comprising a U-shaped band having a bottom, side walls and end walls, said support being substantially of same length as said filter cloth and made by molding from a flexible plastic material, said filter cloth being secured approximately parallel to and spaced from said bottom, the longitudinal and transverse edges of said filter cloth being embedded throughout their contour in the side walls of said support in the vicinity of the edge of said walls and in the end walls of said support during the molding of said support so that the support material may flow through the meshes of the embedded edges of said filter cloth, one of said side walls of said support having inlet means for permitting the ingress of the fluid to be filtered into the space available in the U-shaped support and bound by said filter cloth, said filter element being wound as a spiral laid edge-wise on said bottom of said housing and having its turns relatively spaced from one another, means for maintaining the shape of the spiral and including a groove of same shape formed in the bottom of said housing and adapted to be engaged by that side wall of the filter element which comprises the said inlet means, said cover having on its inner face blind recesses adapted to be engaged by studs projecting from the upper spiral-shaped face of the opposite side wall of said U-shaped support, the bottom of said housing being formed with apertures opening on the one hand outside and on the other hand inside said spiral-shaped groove and being in fluid-tight communication with said inlet means, the fluid-tightness of the communication between the apertures formed in the groove of said housing and the said inlet means being obtained by the provision of a pair of divergent lips formed integrally with the side wall formed with said inlet means, said lips extending throughout the length of said side wall on either side of said fluid inlet means and resting on the bottom of said housing groove, the said cover of said housing being provided with an aperture for discharging the filtered fluid.

3. A filter element adapted to be mounted in a filter housing and comprising a strip-shaped filter cloth consisting of yarns of thermoplastic material, a support for said filter cloth consisting of a U-shaped band having a bottom, side walls and end walls, said support being substantially of same length as said filter cloth and made by molding from a flexible thermoplastic material, said filter cloth being secured approximately parallel to and spaced from said bottom, the longitudinal and transverse edges of said filter cloth being embedded throughout their contour in the side walls of said support in the vicinity of the edge of said walls and in the end walls of said support during the molding of said support so that the support material may flow through the meshes of the embedded edges of said filter cloth, one of said side walls of said support comprising inlet means for permitting the ingress of the fluid to be filtered into the space available in the U-shaped support and bound by said filter cloth, so that said filter element may be cut to the desired length and subsequently closed at both ends by clamping and heating these ends so that the thermoplastic material will soften and the ends of the filter cloth will be embedded therein.

4. A multiple filter element comprising at least two single elements each comprising a strip-shaped filter cloth of flexible material, a support for said filter cloth comprising a U-shaped band having a bottom, side walls and end walls, said support being substantially of same length as said filter cloth and made by molding from a flexible plastic material, said filter cloth being secured approximately parallel to and spaced from said bottom, the longitudinal and transverse edges of said filter cloth being embedded throughout their contour in the side walls of said support in the vicinity of the edge of said walls and in the end walls of said support during the molding of said support so that the support material may flow through the meshes of the embedded edges of said filter cloth, one of said side walls of said support comprising inlet apertures for permitting the ingress of the fluid to be filtered into the space available in the U-shaped support and bound by said filter cloth, said single elements being superposed to one another so as to operate in parallel that is, with said side wall of the upper filter element which comprises inlet apertures for the fluid to be filtered resting on the wall of the underlying filter element opposite to that which comprises inlet apertures for the fluid to be filtered, said opposite wall comprising outlet apertures communicating with the inlet apertures provided in said side wall of the upper filter element, said last mentioned side wall comprising sealing means consisting of a pair of divergent lips solid with, and extending throughout the length of said side wall, on either side of said fluid inlet apertures of the same side wall.

References Cited in the file of this patent

UNITED STATES PATENTS

| | | |
|---|---|---|
| 1,742,743 | Worbois | Jan. 7, 1930 |
| 2,322,548 | Sigmund | Jan. 22, 1943 |

FOREIGN PATENTS

| | | |
|---|---|---|
| 32,098 | France | Apr. 5, 1927 |